United States Patent
Deo et al.

(10) Patent No.: US 12,157,691 B2
(45) Date of Patent: Dec. 3, 2024

(54) ACID GRAFTED EO-PO COPOLYMERS AS SILICA SCALE INHIBITORS

(71) Applicants: Dow Global Technologies LLC, Midland, MI (US); Rohm and Haas Company, Collegeville, PA (US)

(72) Inventors: Puspendu Deo, Pearland, TX (US); Graham P. Abramo, Penllyn, PA (US); Kaylie L. Young, Sugar Land, TX (US); Somil Chandrakant Mehta, Mumbai (IN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 738 days.

(21) Appl. No.: 15/734,075

(22) PCT Filed: May 17, 2019

(86) PCT No.: PCT/US2019/032868
§ 371 (c)(1),
(2) Date: Dec. 1, 2020

(87) PCT Pub. No.: WO2019/231715
PCT Pub. Date: Dec. 5, 2019

(65) Prior Publication Data
US 2021/0221724 A1   Jul. 22, 2021

(30) Foreign Application Priority Data

Jun. 1, 2018 (IN) .............................. 201841020598

(51) Int. Cl.
| | |
|---|---|
| C02F 5/12 | (2023.01) |
| C08F 220/06 | (2006.01) |
| C08F 220/28 | (2006.01) |
| C08F 283/06 | (2006.01) |
| C08G 81/02 | (2006.01) |
| C02F 1/00 | (2023.01) |
| C02F 1/68 | (2023.01) |
| C02F 101/10 | (2006.01) |

(52) U.S. Cl.
CPC .............. C02F 5/12 (2013.01); C08F 220/06 (2013.01); C08F 220/286 (2020.02); C08F 283/06 (2013.01); C08G 81/025 (2013.01); C02F 1/00 (2013.01); C02F 1/683 (2013.01); C02F 2101/10 (2013.01); C02F 2303/22 (2013.01); C08G 2261/128 (2013.01)

(58) Field of Classification Search
None
See application file for complete search history.

(56) References Cited

U.S. PATENT DOCUMENTS

| | | | |
|---|---|---|---|
| 4,146,488 | A | 3/1979 | Martin |
| 4,392,972 | A | 7/1983 | Mohr et al. |
| 4,404,114 | A | 9/1983 | Mohr et al. |
| 4,552,901 | A | 11/1985 | Bauman et al. |
| 4,618,448 | A | 10/1986 | Cha et al. |
| 4,933,090 | A * | 6/1990 | Gill .......................... C02F 5/14 252/180 |
| 5,035,894 | A | 7/1991 | Lee et al. |
| 5,374,674 | A | 12/1994 | Sojka |
| 5,378,368 | A | 1/1995 | Gill |
| 5,952,432 | A * | 9/1999 | Yamaguchi .......... C11D 3/3757 525/403 |
| 6,051,142 | A | 4/2000 | Roe |
| 6,143,243 | A | 11/2000 | Gershun et al. |
| 6,166,149 | A * | 12/2000 | Yamaguchi ........... C08F 283/06 525/63 |
| 6,447,696 | B1 * | 9/2002 | Takagi ................. C11D 3/3776 510/276 |
| 7,182,981 | B1 | 2/2007 | Tachibana et al. |
| 7,316,787 | B2 | 1/2008 | Hendel et al. |
| 10,160,682 | B2 | 12/2018 | Mehta et al. |
| 2009/0176925 | A1 | 7/2009 | Matsunaga et al. |
| 2011/0114564 | A1 | 5/2011 | Amjad et al. |

FOREIGN PATENT DOCUMENTS

| | | |
|---|---|---|
| JP | 09192691 A | 7/1997 |
| JP | 2001106743 A | 4/2001 |

OTHER PUBLICATIONS

Office Action from corresponding Japanese application: 2020-567068 dated Mar. 29, 2023.
PCT/US2019/032868, International Search Report and Written Opinion with a mailing date of Dec. 5, 2019.
PCT/US2019/032868, International Preliminary Report on Patentability with a mailing date of Dec. 1, 2020.

* cited by examiner

*Primary Examiner* — Clare M Perrin

(57) ABSTRACT

A method for inhibiting silica scale formation which treats aqueous systems with a polymerizable-acid graft copolymer that includes an unsaturated grafting acid and having a percent acid graft of between about 3 wt. % and about 35 wt. %, as well as an alkylene oxide polymer backbone.

3 Claims, No Drawings

ACID GRAFTED EO-PO COPOLYMERS AS SILICA SCALE INHIBITORS

CROSS-REFERENCE

This International Patent Application claims priority to Indian Provisional Application No. 201841020598, filed Jun. 1, 2018.

FIELD OF THE INVENTION

This invention relates to scale inhibition. Specifically, this invention relates to the use of acid grafted EO-PO copolymers to inhibit the formation of silica scales.

BACKGROUND OF THE INVENTION

As their name implies, "graft copolymers" describe a polymer "branch" that is grafted onto a separate "backbone" and are well known in the art. For example, graft copolymers are disclosed in U.S. Pat. Nos. 5,374,674, 5,035,894 and 4,552,901.

Silica and metal silicate scales are problematic in many industries utilizing aqueous systems. The segments most impacted are industrial water treating, specifically reverse osmosis (RO), cooling towers, boilers, and oil and gas applications, in particular geothermal energy harvesting and steam assisted gravity drainage (SAGD) applications. Mining operations such as alumina refining utilizing the Bayer process also have significant issues with silica and silicate scales.

Silica and silicate scale formation is dependent on operating conditions such as pH, temperature, silica concentration and the presence of polyvalent metal ions present in the water used in such systems. Based on those conditions different types of silica or silicate scales may form. For example, at pH values above 8.5, silica scale is predominantly in the form of metal silicates, depending on the presence of multivalent ions such as $Mg^{2+}$, $Ca^{2+}$, $Al^{3+}$, or $Fe^{3+}$, whereas colloidal silica (polymerized silica particles) is more common at pH values between 6.5 and 8.5. The scale can deposit on the production equipment and ultimately restrict flow, leading to costly process downtime. Typical scale removal treatments involve mechanical cleaning or hazardous and corrosive acid washes, such as hydrofluoric acid washes.

Scale inhibitors are known in the art. For example, U.S. Pat. No. 6,166,149 discloses the process for making a hydrophilic graft polymer-containing composition that is suitable as a scale inhibitor comprising a hydrophilic graft polymer and polyether compound, and optionally further comprises unsaturated carboxylic acid type polymers. Similarly, U.S. Pat. No. 5,378,368 discloses the use of polyether polyamino methylene phosphonates to control silica/silicate deposition in industrial water systems. The polyether polyamino methylene phosphonates may be used alone or in combination with a polymer additive.

U.S. Pat. No. 4,618,448 discloses the use of a carboxylic/sulfonic/polyalkylene oxide polymer as a scale inhibitor, while U.S. Pat. No. 4,933,090 discloses the use of a select phosphonate and optionally a carboxylic/sulfonic/polyalkylene oxide polymer to control silica/silicate deposition. U.S. Pat. No. 6,051,142 discloses the use of ethylene oxide-propylene oxide (EO-PO) block copolymers to control silica and silicate scales in cooling and boiler water systems. Finally, U.S. Pat. No. 7,316,787 discloses the use of hydrophobically modified ethylene oxide polymers as colloidal silica scale inhibitors.

Despite the development of new scale inhibitors, silica scaling continues to be a major challenge in aqueous systems, thus demonstrating the need for polymers with scale inhibition performance beyond those known in the art.

SUMMARY OF THE INVENTION

In accordance with one aspect of the invention, there is provided a method of inhibiting silica scale formation via treating an aqueous system containing silica with an effective amount of a polymerizable-acid graft copolymer comprising an unsaturated grafting acid (such as acrylic acid, methacrylic acid, itaconic acid, maleic acid, 2-acrylamido-2-methylpropylsulfonic acid (AMPS), 2-methacrylamido-2-methylpropylsulfonic acid, styrene sulfonic acid, vinylsulfonic acid, ethylene glycol methacrylate phosphate, or vinyl phosphonic acid), having a percent acid graft of between about 3% and about 35% weight, and an alkylene oxide polymer backbone, the alkylene oxide polymer backbone having the formula:

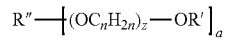

wherein each R' is independently either a hydrogen atom, hydrogen radicals, or acyl radicals; R" is independently either a hydrogen atom, hydrogen radicals, amine-containing radicals, or acyl radicals; each "n" has, independently, a value of from 2 to 4; each "Z" has, independently, a value of from 4 to about 1800; and "a" has a value of from 1 to 4. In a preferred embodiment, "n"=2 or 3; "a" has a value of 1; and each R' or R" is independently either a hydrogen atom, hydrogen radicals, or acyl radicals, resulting respectively in either an ethylene oxide ("EO") or propylene oxide ("PO") polymer. The base polymer preferably has a molecular weight of between about 200 Daltons and 80,000 Daltons.

The disclosed invention covers the novel use of an acrylic acid grafted ethylene oxide-propylene oxide (EO-PO) copolymer as a colloidal silica scale inhibitor that can be used in reverse osmosis (RO), cooling tower, boiler, geothermal, and SAGD applications. In a preferred embodiment, the copolymer for use in the disclosed invention is a copolymer of EO and PO with a molecular weight of approximately 5000 Daltons, with approximately 10% by weight of acrylic acid grafted to the alkylene oxide polymer backbone. One advantage of this copolymer is that it inhibits the formation of colloidal silica with minimal formation of precipitates (flocs) that can negatively impact the above-mentioned applications.

DETAILED DESCRIPTION OF THE PREFERRED EMBODIMENTS

The disclosed invention covers a method of inhibiting silica scale formation via treating an aqueous system containing silica with an effective amount of a polymerizable-acid graft copolymer comprising an unsaturated grafting acid (such as an acid selected from the group consisting of acrylic acid, methacrylic acid, itaconic acid, maleic acid, 2-acrylamido-2-methylpropylsulfonic acid (AMPS), 2-methacrylamido-2-methylpropylsulfonic acid, styrene sulfonic acid, vinylsulfonic acid, ethylene glycol methacrylate phosphate, vinyl phosphonic acid), having a percent acid graft of between about 3% and about 35% weight, and an alkylene oxide polymer backbone, the alkylene oxide polymer backbone having the following formula:

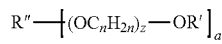

Wherein each R' is independently selected from a hydrogen atom, hydrogen radicals, or acyl radicals; R" is selected from a hydrogen atom, hydrogen radicals, amine-containing radicals, or acyl radicals; each "n" has, independently, a value of from 2 to 4; each "Z" has, independently, a value of from 4 to about 1800; and "a" has a value of from 1 to 4. In one embodiment, R' is acyl radicals free of aliphatic unsaturation. In another embodiment, R' and R" are not both a hydrogen atom.

All percentages stated herein are weight percentages (wt. %), unless otherwise indicated.

Temperatures are in degrees Celsius (° C.), and "ambient temperature" means between 20° C. and 25° C., unless specified otherwise.

"Polymer" generally refers to a polymeric compound or "resin" prepared by polymerizing monomers, whether of the same or different types. As used herein, the generic term "polymer" includes polymeric compounds made from one or more types of monomers. "Copolymers" as used herein are polymeric compounds prepared from two or more different types of monomers. Similarly "ter-polymers" are polymeric compounds prepared from three different types of monomers.

"Aqueous system" generally refers to any system containing water including, but not limited to, cooling water, boiler water, desalination, gas scrubbers, blast furnaces, sewage sludge thermal conditioning equipment, filtration, reverse osmosis, sugar evaporators, paper processing, mining circuits, and the like.

The term "silica scale" generally refers to solid materials containing silica that are deposited and accumulated on internal surfaces of water treatment equipment. "Silica scale" generally includes multiple types of silica scale such as colloidal or amorphous silica ($SiO_2$) and silicate (such as magnesium silicate). The accumulated silica scale may be, and sometimes is, a combination of silica and silicate types of scale, often where one or the other type of scale predominates. Colloidal/amorphous silica scale is the term used hereinafter to generally refer to silica scale deposits that are predominantly of the colloidal/amorphous silicate type. Other kinds of scale besides the silica types may be present, such as calcium carbonate, calcium sulfate, calcium phosphate, calcium phosphonate, calcium oxalate, barium sulfate, silica, alluvial deposits, metal oxide, and metal hydroxide, depending upon what kinds of metals and other ions are present in the aqueous system.

The chemical reaction mechanism for formation of colloidal/amorphous silica scale generally involves condensation polymerization of silicic acid to polysilicates, catalyzed by hydroxide ions. This reaction mechanism proceeds generally as follows:

$Si(OH)_4 + OH^- \rightarrow (OH)_3SiO^- + H_2O$ (I)

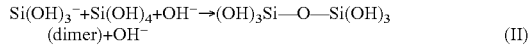

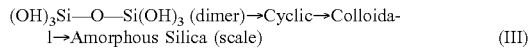

Since the reaction mechanism is catalyzed by hydroxide ions, it proceeds slowly at low pH, but increases significantly above pH of about 7. Thus, prevention of silica scale formation in aqueous systems having "neutral" pH, such as, between 6.5 and 8.5, is of particular concern.

The method of the present invention is suitable for controlling deposition of colloidal/amorphous silica scale in aqueous systems having a pH between 6.5 and 10.0, at temperatures ranging from 20° C. to 250° C. The method comprises adding to the aqueous system an effective amount of an acrylic acid grafted ethylene oxide-propylene oxide (EO-PO) copolymer.

Graft Polymers

Graft polymers are segmented copolymers comprising (1) a linear backbone polymer and (2) randomly distributed branches of another polymer.

Backbone Polymer

The poly(alkylene oxide) compounds used to make the graft copolymers are commonly produced by reacting an alkylene oxide or a mixture of alkylene oxides, added sequentially or in combination, with an alcohol. Such alcohols can be monohydric or polyhydric and correspond to the formula $R''(OH)_a$, wherein R" is selected from the group consisting of a hydrogen atom, hydrogen radicals, amine-containing radicals and acyl radicals, and "a" has a value of from 1 to 4. Such alcohols include methanol, ethanol, propanol, butanol, ethylene glycol, glycerol, the monoethylether of glycerol, the dimethyl ether of glycerol, sorbitol, 1,2,6-hexanetriol, trimethylolpropane, and the like.

Generally, the poly(oxyalkylene) compounds used in this invention have molecular weights (number average) in the range of about 200 Daltons to about 80,000 Daltons, preferably from about 1500 Daltons to about 20,000 Daltons.

The grafting of the polymerizable-acid onto the poly (oxyalkylene) compounds can be carried out by free radical polymerization, to afford a grafted acid content of between about 3 and about 35 (preferably between about 5 and about 25).

Useful grafting acids include, among others, acrylic acid, methacrylic acid, itaconic acid, maleic acid, 2-acrylamido-2-methylpropylsulfonic acid (AMPS), 2-methacrylamido-2-methylpropylsulfonic acid, styrene sulfonic acid, vinylsulfonic acid, ethylene glycol methacrylate phosphate, and vinyl phosphonic acid, with acrylic acid, maleic acid and vinyl phosphonic acid being more preferable, and acrylic acid being most preferable.

The poly(oxyalkylene) compounds useful in the present invention have the formula have the formula:

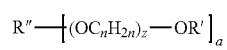

wherein each R' is independently either a hydrogen atom, hydrogen radicals, or acyl radicals; R" is independently either a hydrogen atom, hydrogen radicals, amine-containing radicals, or acyl radicals; each "n" has, independently, a value of from 2 to 4; each "Z" has, independently, a value of from 4 to about 1800; and "a" has a value of from 1 to 4. In a preferred embodiment, the poly(oxyalkylene) compounds are poly(oxyethylene-oxypropylene) polymers such that "n"=2 or 3; "a" has a value of 1; and each R' or R" is independently either a hydrogen atom, hydrogen radicals, or acyl radicals, resulting respectively in either an ethylene oxide ("EO") or propylene oxide ("PO") polymer.

The poly(oxyethylene-oxypropylene) polymers have a weight ratio of oxyethylene ("EO") to oxypropylene ("PO")

of between 0:100 and 100:0. EO-PO copolymers are particularly suited as a backbone for the graft polymers of the present invention, as they are capable of inhibiting the formation of silica scales. EO-PO copolymers are organic compounds comprising ethoxy and propoxy groups and suitable EO-PO copolymers may comprise random copolymers of EO/PO, homo-polymers of EO, homo-polymers of PO, block copolymers of EO/PO, and reverse block copolymers of EO/PO. The weight ratio of EO:PO can be from about 100:0 to about 0:100, and is preferably from about 90:10 to about 10:90, and is more preferably from about 75:25 to about 25:75, and most preferably about 50:50. The graft polymer of the present invention preferably comprises 65 wt. % to 97 wt. % of backbone polymer.

Method of Use

"Effective amount" is that amount of the graft copolymer necessary to inhibit deposition of colloidal/amorphous silica scale in the aqueous system being treated. "Inhibit" means to retard the deposition of colloidal/amorphous silica scale to prolong period of maximal efficiency of equipment. The effective amount of graft copolymer added to the aqueous system may vary depending upon the temperature and pH of the aqueous system along with the concentration of silica, salts, and polyvalent metal ions present in the aqueous system. In most applications, the effective amount of graft copolymer ranges from about 0.5 ppm to about 1000 ppm, and more preferably from about 1 ppm to 100 ppm. The aqueous systems treated by the present graft copolymer typically have a silica content of more than 30 ppm, 50 ppm or even 100 ppm.

The method of polymerization employed to prepare the graft polymers useful in the method of the present invention for controlling deposition is not particularly limited and may be any method known, now or in the future, to persons of ordinary skill including, but not limited to, emulsion, solution, addition and free-radical polymerization techniques, including the methods disclosed in U.S. Pat. Nos. 4,146,488, 4,392,972, 5,952,432, and 6,143,243, which are hereby incorporated by reference.

The use, application and benefits of the present invention will be clarified by the following discussion and description of exemplary embodiments of the present invention.

EXAMPLES

The following Examples illustrate various nonlimiting embodiments of the invention disclosed and claimed herein as well as certain attributes thereof.

Grafting of Acid onto Copolymers

An acid graft copolymer was prepared using acrylic acid and a base polymer consisting of butanol-initiated poly(oxyethylene-oxypropylene) copolymer having a molecular weight of 770 and a viscosity of 170 Saybolt seconds at 37.8° C. as follows:

Into a 5-liter, 3-neck round bottom flask fitted with a water condenser, thermocouple, stirrer, and means of introducing acrylic acid and catalyst, was placed 2700 g of the base polymer. By means of a heating mantle, the flask was heated to a temperature of 150° C., followed by the addition of 35 g of tertiary-butyl perbenzoate and 312 g of acrylic acid. A peroxide feed was begun 10 minutes prior to starting the acid feed and both ingredients were fed over a period of 90 minutes after which the product was allowed to cool to room temperature.

Static Bottle Test

Static bottle testing was used to evaluate the efficacy of various polymers to inhibit silica polymerization. Free silica remaining in solution (reactive silica) was tracked using the HACH silicomolybdate colorimetric method. Polymers with higher efficacy at inhibiting colloidal silica formation maintained higher levels of free silica in solution over time. Supersaturated silica solutions were prepared by dissolving sodium silicate salt in deionized water to yield an initial silica concentration of 400 ppm as $SiO_2$.

In the first set of static bottle tests, 5, 15 and 25 ppm (as actives) of the inhibitor of the invention were dosed into the supersaturated silica solution and the pH was adjusted to 7.5. The samples were then allowed to sit undisturbed for 24 hours at 20° C. After 24 hours, the silica solutions were mixed well and analyzed for turbidity with a turbidimeter to check for the presence of insoluble flocs. The silica samples were then filtered with 0.45 µm filters and the filtrate was analyzed using the HACH colorimetric method. Sample A is the acrylic acid (AA) grafted ethylene oxide-propylene oxide copolymer. Sample B is a copolymer of ethylene oxide-propylene oxide without grafting After final soluble silica concentrations of the solutions containing the inhibitor and the solutions lacking the inhibitor were measured, the percent scale inhibition was calculated according to the following formula:

$$\frac{\text{Final silica concentration with inhibitor} - \text{Final silica concentration without inhibitor}}{\text{Initial silica concentration} - \text{Final silica concentration without inhibitor}} * 100$$

The results of the turbidity and silica inhibition tests are summarized in Table 1.

TABLE 1

|  | Blank | Sample A | | | Sample B | | |
| --- | --- | --- | --- | --- | --- | --- | --- |
|  |  | 5 ppm | 15 ppm | 25 ppm | 5 ppm | 15 ppm | 25 ppm |
| Soluble Silica @ t = 24 h | 200 | 270 | 310 | 320 | 290 | 320 | 330 |
| Percent inhibition @ t = 24 h | 0 | 44 | 69 | 75 | 56 | 75 | 81 |
| Turbidity @ t = 24 h (NTU) | 0.2 | 0.2 | 0.2 | 0.2 | 16 | 31 | 42 |

It was determined that Sample A maintained a high level of reactive silica in solution without forming insoluble precipitates, or flocs. In comparison, Sample B exhibited inhibition of colloidal silica, but resulted in insoluble flocs that greatly increased the turbidity of the silica brine.

In a second set of static bottle tests, 100 ppm of $Ca^{2+}$, added as calcium chloride dihydrate, and 40 ppm of $Mg^{2+}$, added as magnesium chloride hexahydrate, were added in addition to 400 ppm $SiO_2$, added as sodium silicate to evaluate the effect of hardness ions. After the addition of the inhibitor at 5, 15 and 25 ppm (as actives) the brine pH was adjusted to 7.5. The samples were then allowed to sit undisturbed for 24 hours at 20° C. After 24 hours, the silica solutions were mixed well and analyzed for turbidity with a turbidimeter to check for the presence of insoluble flocs. The silica samples were then filtered with 0.45 µm filters and the filtrate was analyzed using the HACH colorimetric method. Sample A is the acrylic acid (AA) grafted ethylene oxide-propylene oxide copolymer. Sample B is a copolymer of ethylene oxide-propylene oxide without grafting. The results of the turbidity and silica inhibition tests are summarized in Table 2.

TABLE 2

|  | Blank | Sample A | | | Sample B | | |
|---|---|---|---|---|---|---|---|
|  |  | 5 ppm | 15 ppm | 25 ppm | 5 ppm | 15 ppm | 25 ppm |
| Soluble Silica @ t = 24 h | 180 | 250 | 270 | 280 | 270 | 290 | 300 |
| Percent inhibition @ t = 24 h | 0 | 41 | 53 | 59 | 52 | 64 | 70 |
| Turbidity @ t = 24 h (NTU) | 0.4 | 1.5 | 5 | 6.5 | 14 | 29 | 38 |

It was determined that Sample A maintained a high level of reactive silica in solution with significantly lower quantity of insoluble precipitates, or flocs, with minimum turbidity. In comparison, Sample B exhibited inhibition of colloidal silica, but resulted in greater amount of insoluble flocs that greatly increase the turbidity of the silica brine.

Although the invention has been described by reference to its preferred embodiment as is disclosed in the specification and drawings above, many more embodiments of the invention are possible without departing from the invention. Thus, the scope of the invention should be limited only by the appended claims.

What is claimed is:

1. A method of inhibiting silica scale formation, said method comprising the steps of: treating an aqueous system comprising silica with an effective amount of a polymerizable-acid graft polymer consisting of an unsaturated grafting acid and an alkylene oxide polymer backbone, said alkylene oxide polymer backbone having the following formula:

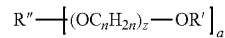

wherein each R' is independently selected from the group consisting of a hydrogen radical, and acyl radicals;
wherein R" is independently selected from the group consisting of a hydrogen radical, amine-containing radicals, and acyl radicals;
wherein each "n" has, independently, a value of from 2 to 4;
wherein each "Z" has, independently, a value of from 4 to about 1800; and
wherein "a" has a value of from 1 to 4;
wherein said grafting acid is present in an amount of 10 wt.

2. The method of claim 1 wherein the grafting acid is acrylic acid.

3. The method of claim 1 wherein said alkylene oxide polymer backbone is poly(oxyethylene-oxypropylene) having a weight ratio of oxyethylene ("EO") to oxypropylene ("PO") of about 50:50.

* * * * *